3,299,197
GROUND-BASED FLIGHT TRAINING
APPARATUS
Albert Ernest Cutler, Barnet, England, assignor to Communications Patents Ltd., London, England
Filed Jan. 3, 1963, Ser. No. 249,244
Claims priority, application Great Britain, Jan. 11, 1962, 1,034/62
7 Claims. (Cl. 35—10.2)

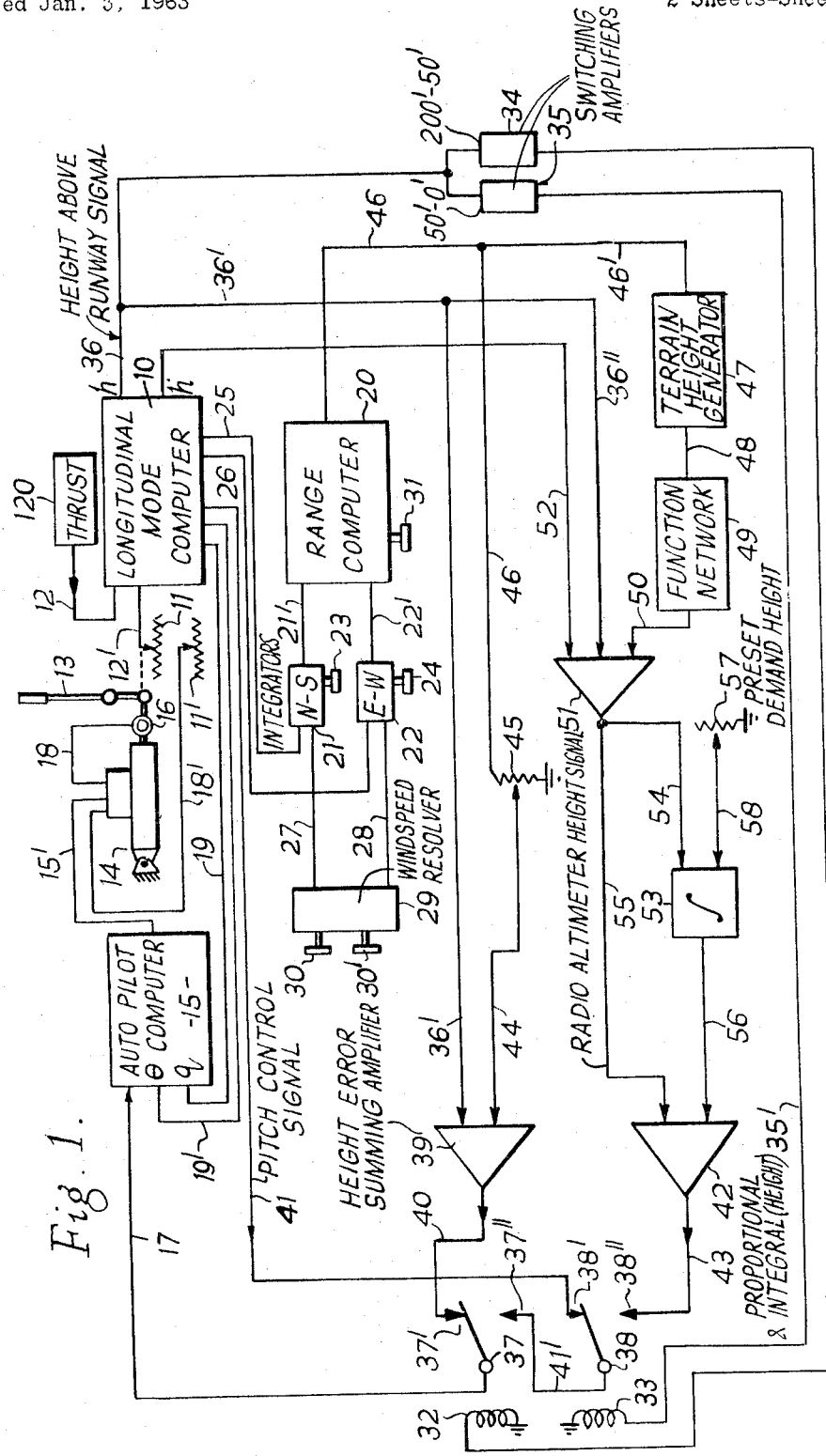

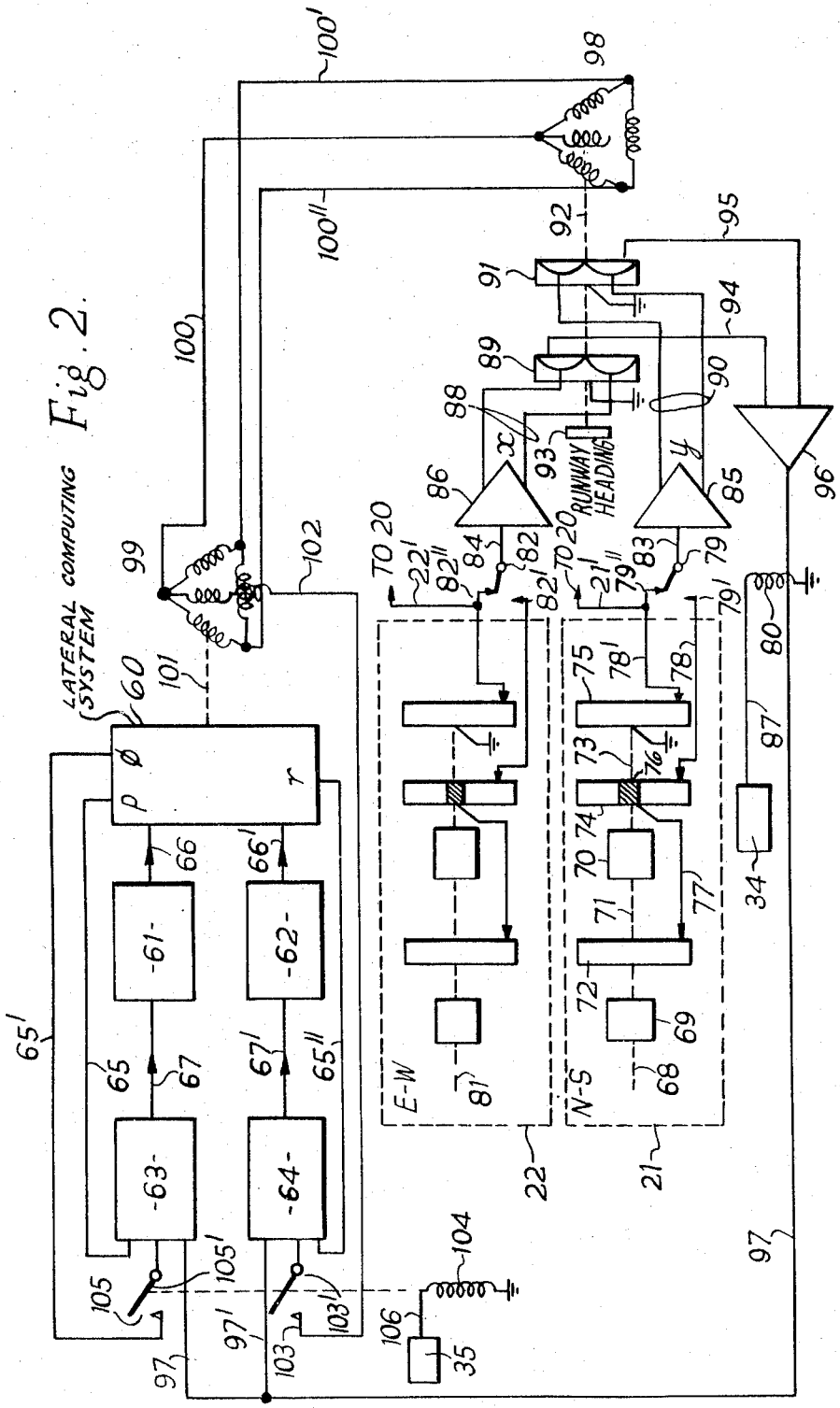

This invention relates to ground-based flight training or simulating apparatus for aircraft of the kind which includes an automatic blind landing system and more particularly to such apparatus which simulates realistically the operation of the blind landing system during the low altitude phases of flight.

In actual aircraft equipped with an automatic blind landing system, the control surfaces are operated by an automatic pilot, in response to signals representative of the aircraft's flight with respect to a desired approach path. The desired approach path is defined by radio beams, leader cables or the like means which provide an electric error signal.

It is known to provide, in flight training equipment, apparatus for simulating the operation of an instrument landing system (I.L.S.) of the glide path/localiser beacon type, such as is at present installed in most aircraft. In such simulating apparatus, alternative operating conditions are simulated, whereby the aircraft is either manually controlled with the aid of a crossed pointers type of indicator, or is automatically controlled by means of an auto-pilot.

Training equipment has been proposed in which a simulated auto-pilot is controlled by signals derived from the computing units of an instrument landing system.

In the I.L.S. system generally used in aircraft, the glide path is a straight line and does not therefore permit aircraft to be flown automatically to touchdown. Refinements introduced into blind landing systems of recent design enable the whole of an approach to be carried out safely by automatic means.

It is an object of the present invention to provide training apparatus for simulating the operation of an aircraft using an automatic blind landing system, of the type which is operative from the commencement of an approach, at circuit height, down to touchdown.

Accordingly, the present invention provides ground-based flight training apparatus for simulating operation of an aircraft automatic landing system, comprising flight computing means for simulating flight conditions, auto-pilot simulating means for simulating longitudinal and lateral control by an aircraft auto-pilot, said auto-pilot simulating means being responsive to a plurality of alternative control signals corresponding each to a different longitudinal control mode, control signal generating means for each of the alternative control signals and switch means operated at different altitudes for supplying to the auto-pilot simulating means a selected one of the alternative control signals, the said altitudes being computed by the flight computing means.

In order that the invention may be readily carried into effect, an embodiment thereof will now be described, by way of example, with reference to the accompanying drawings, in which:

FIG. 1 is a schematic diagram of apparatus for simulating that part of an automatic blind landing system providing longitudinal control, and FIG. 2 is a schematic diagram of apparatus for simulating that part of an automatic blind landing system providing lateral control.

In blind landing systems of the type with which the present invention is concerned, a separate mode of control is used for each of a number of adjacent height bands. Control signals are made effective through the medium of a conventional auto-pilot provided with I.L.S. coupling in the associated computer.

In the apparatus now to be described, a system having separate modes of control in three height bands is simulated. The apparatus is used with a flight simulator having an electronic computer of conventional form, which computer will not therefore be described in detail in this specification, except in respect of additional pick-offs which are added for deriving control signals used to feed the simulated automatic blind landing system.

Referring to FIG. 1, computing systems of the flight simulator, concerned with the provision of longitudinal control, are shown in the upper part of the diagram. A longitudinal mode computing system 10 includes rate of pitch and pitch angle integrators, an angle of attack and lift coefficient system, true and indicated airspeed and Mach number systems, gross weight and pitch moment of inertia systems, and a height computing system. Input signals corresponding to thrust and to the deflection of an elevator control 13 are fed to the computing system 10 from a source 120 associated with the engine computer of the simulator and from a potentiometer 11, respectively, by way of lines 12 and 12', respectively, to enable the flight of the aircraft to be simulated in the pitch plane. A flight computer incorporating such a longitudinal mode computing system is described in Section 5 of a paper entitled, "Flight Simulators," published in "The Journal of the Royal Aeronautical Society," vol. 58, No. 519, March 1954.

The elevator control 13 is coupled mechanically to the potentiometer 11 and to an electrically controlled hydraulic servo 14 which provides "feel" to the control 13. The output signal of a transducer 16, representing the force applied by the pilot, is applied to the control system of the servo, via line 18. This signal is "answered" by an opposing signal on line 18', from a potentiometer 11' also coupled mechanically to the elevator control 13.

The elevator channel of the auto-pilot computer 15 provides a demand signal, on line 15', to position the servo 14 when the auto-pilot is in use.

It is customary for an auto-pilot to provide several modes of control, such as constant height, constant rate of climb, constant incidence, constant pitch angle or I.L.S. glide path. In FIG. 1 the input to the auto-pilot computer 15 is provided by way of line 17, from a simulated automatic blind landing system, in a manner described more fully below. Inputs providing the other forms of control referred to are not shown. Attitude and rate data for the operation of the computer 15, in the form of signals corresponding to rate of pitch and pitch angle, represented by $q$ and $\theta$ respectively, are derived from the computing system 10 and are fed, by way of lines 19 and 19' respectively, to the auto-pilot computer 15.

The range of the simulated aircraft from the desired point of touchdown is determined in a computing system 20. The computing system 20 is fed with signals from integrators 21 and 22, corresponding respectively to North-South and East-West distances of the simulated aircraft from the point of touchdown.

The integrators 21 and 22 are fed with signal components of true airspeed, after resolution of the true airspeed signal in the computing system 10, and with signal components of windspeed from a windspeed resolver 29. The North-South components of airspeed and windspeed are fed to the integrator 21, via lines 25 and 27 respectively, and the East-West components of airspeed and windspeed are fed to the integrator 22 via lines 26 and 28 respectively. The assumed values for speed and direction of wind are set in by manual controls 30 and 30' of the resolver 29. The integrators 21 and 22 are provided with preset controls, which are not shown, to position the aircraft at the start of an exercise and with manual controls 23 and 24 respectively. The integrators 21 and 22 convert the velocity components of groundspeed produced by the combined airspeed and windspeed components to displacements with respect to a predetermined point of reference. The manual controls enable the North-South and East-West position co-ordinates of the desired point of touchdown, with respect to the same point of reference, to be set into differential mechanisms which are not shown and which form a part of the mechanism of each integrator. The touchdown position co-ordinates and the aircraft displacement co-ordinates are summed in the differentials and the resulting shaft outputs are used to drive potentiometers which provide signals representing the North-South and East-West distances of the simulated aircraft from the point of touchdown.

In the computing system 20, these signals are fed to the stator coils of a resolver, not separately shown, the rotor coils of which are set, by a manual control 31 to an angular position corresponding to the azimuth of the simulated runway. The signal provided by one rotor coil of the resolver represents the angular difference between the simulated flight path and the runway azimuth. The signal provided by the other rotor coil of the resolver represents the range of the simulated aircraft from the runway. It is assumed that the aircraft has been flown to its simulated position in relation to the point of touchdown and is lined up for an approach and that the angular difference between the simulated aircraft heading and the runway azimuth is not large. The manner in which a range signal is provided using a resolver is described in Section 4 (Resolution) and illustrated in FIG. 13 of a paper entitled "Flight Simulators" published in "The Journal of the Royal Aeronautical Society," vol. 58, No. 519, March 1954.

In the arrangement of the embodiment, a separate form of control is used in each of three height bands. The upper and lower limits of the bands are determined by the operation of relays 32 and 33. The coils of relays 32 and 33 are energized with signals derived from switching amplifiers 34 and 35 respectively fed to the coils by lines 34' and 35' respectively.

The switching amplifiers are fed, via line 36, with a height-above-runway signal from the height computing servo of the computing system 10. Relay 32 is provided with change-over contacts 37, 37', 37'' and relay 33 is provided with change-over contacts 38, 38', 38''.

In the first stage of an approach, corresponding to descent from 1500 feet to 200 feet, the amplitude of the height signal fed to the amplifiers 34 and 35 is such that the coils of the relays are not energised and contacts 37, 37' and 38, 38' are closed. With these contacts closed, a signal is fed from a summing amplifier 39, via lines 40 and 17 to the auto-pilot computer 15.

In the second stage of an approach, corresponding to descent from 200 feet to 50 feet, the amplitude of the height signal is such that amplifier 34 is operated. Current then flows to energise the coil of relay 32, to cause contacts 37, 37'' to close. With contacts 37, 37'' closed, a signal is fed from the computing system 10, via lines 41, 41' and 17, to the input of the auto-pilot computer 15.

In the third stage of an approach corresponding to descent from 50 feet to touchdown, the amplitude of the height signal is such that amplifiers 34 and 35 are both operated and the coils of both relays are energised. Contacts 37, 37'' and 38, 38'' are closed and a signal is fed from a summing amplifier 42, via lines 43, 41' and 17 to the auto-pilot computer 15.

The first stage of an automatic approach is carried out using conventional I.L.S./auto-pilot coupling. This is performed in the simulator by computing the value $(R\delta - h)$, the height error, and using this as a control input to the auto-pilot. The value R is the range of the simulated aircraft from the runway and the value $h$ is the height of the simulated aircraft above the runway. Range and height signals are provided by computing systems 20 and 10 respectively in the manner already described.

The height error is computed in the summing amplifier 39, from a height-of-glide-path signal and the height signal $h$ fed to the input of the amplifier on lines 44 and 36' respectively. The height-of-glide-path signal is obtained as a fraction $(\delta)$ of the range signal, from potentiometer 45 which is fed, via lines 46, with the range signal from the computing system 20.

The approach during the second stage may take the form of a glide with constant incidence or constant rate of descent, but preferably takes the form of a constant pitch angle glide from 200 feet to 50 feet. To maintain constant pitch angle in actual flight, the auto-pilot takes a datum from a pitch gyro incorporated in the auto-pilot system. At the end of this stage the aircraft is in steady motion with angular rates almost zero.

In the simulator, a pitch control signal is obtained, via line 41, from a circuit of the pitch system in the computing system 10.

Alternatively, when the approach during the second stage involves a constant rate of descent, this constant rate may be determined as the average rate of descent during the first stage of approach. This procedure removes the effects due to windspeed and thereby ensures a constant aiming point for touchdown on the runway. This is the method described, for example, in United States patent specification No. 2,987,275, in the names of A. J. Moncrieff-Yeates and others. In the example there described, the second stage extends from 150 feet down to 60 feet, instead of from 200 feet down to 50 feet as in the present example.

The third or flare-out stage is initiated at a height of 50 feet and is governed by an equation:

$$\eta = q + \theta + G_1(h_r + T_1 \dot{h}_r) + G_2 \int [(h_r + T_1 \dot{h}_r) - h_d] \cdot dt$$

where $\eta$ is the elevator angle, $h_r$ is a height derived from a radio altimeter, $\dot{h}_r$ is the rate of change of the height $h_r$, $h_d$ is a demand height and $T_1$, $G_1$, $G_2$ are constants. The rate of pitch is designated $q$ and the angle of pitch by $\theta$.

The flight path during this stage is approximately exponential.

In actual aircraft equipped with blind landing systems, radio-altimeters having a resolution of a few inches are used in order to achieve the desired accuracy of landing. Altimeters with such accurate resolution are necessarily sensitive to small deviations of terrain level relative to runway level and it is necessary to compute, in the simulator, the height of the aircraft above a reference level which will be, for example, the runway and the terrain height above the runway. Let it be assumed that the aircraft flight path is aligned with the runway, then a function generator 47 fed with the range signal R, may be used to provide a signal $h_g$ corresponding to the terrain height above the runway. The generator is a servo driven potentiometer, the winding of which is contoured to provide realistic variations in height as the range decreases. The range signal is fed to the servo by line 46'.

The terrain height signal is fed, via line 48, to a L type network 49 having a resistor and a capacitor connected in parallel in the series arm and a resistor in the shunt arm. In the network 49, the values of the resistors and the capacitor are so chosen that a proportional plus a derivative signal corresponding approximately to the value $-(h_g + T_1 \dot{h}_g)$ is generated. This signal if fed, via line 50, to the first of three inputs of a summing amplifier 51. The second and third inputs of the amplifier are fed, on lines 36'' and 52, with suitable proportions of the height above runway signal $h$ and a rate of change of height above runway signal $\dot{h}$ obtained from the computing system 10.

The output signal of the amplifier 51 corresponds to the value $(h \pm T_1 \dot{h}) - (h_g + T_1 \dot{h}_g)$ and hence to the value of $(h_r + T_1\dot{h}_r)$, the relative or radio-altimeter height, since $h_r = (h - h_g)$.

In actual aircraft, the quantity $(h_r + T_1\dot{h}_r)$ is normally obtained from the radio-altimeter and its associated circuits. In the simulator, this signal is fed to circuits of the automatic blind landing system to produce the proportional plus integral term $$(h_r + T_1\dot{h}_r) + \int[(h_r + T_1\dot{h}_r) - h_d]dt$$

which is in turn fed to the input of the elevator control channel of the auto-pilot computer with pitch angle and rate of pitch signals.

The proportional plus integral term is obtained by feeding the simulated radio altimeter signal to an integrator 53 and by summing, in the amplifier 42, the integral so produced and the radio altimeter signal. The altimeter signal is fed to the integrator 53 and to the amplifier 42, via lines 54 and 55 respectively. The output of the integrator 53 is fed to the amplifier 42 by line 56. A demand height signal $h_d$, provided by the potentiometer 57 is also fed to the integrator 53, via line 58. The potentiometer 57 is preset to provide a signal corresponding to a height slightly below runway level. This is to ensure that the computed integral value continues to increase, so as to have the effect of holding the aircraft down and thus avoid bouncing.

The proportional plus integral signal thus produced is fed to the auto-pilot computer 15, where it is combined with pitch angle and rate of pitch signals to control the flight path of the simulated aircraft during the flare-out stage.

Automatic control of the flight path of an aircraft in a vertical plane may be used with lateral control which is partially automatic or fully automatic. Where control is partially automatic, the pilot takes over visual and manual control of the roll and yaw of the aircraft at about 200 feet. The auto-pilot/I.L.S. localiser coupler is disconnected during the landing operation, leaving the elevator control channel connected to provide automatic control of pitch only. In this case, the drift angle caused by any cross-wind that may be present is corrected by the pilot using the rudder control.

The simulation of partially automatic control requires no modification to conventional flight simulator techniques, the angular difference signal provided by the resolver of the computer system 20 being used to provide I.L.S. localiser control in the usual manner.

The apparatus of FIG. 2 is used to provide simulated lateral control where the control is fully automatic. In FIG. 2 a lateral computing system 60 includes rate of roll and roll angle integrators, rate of yaw and heading angle integrators, roll and yaw moment of inertia systems and an angle of sideslip computing system. With input signals corresponding to the deflection of the aileron and rudder controls, fed to the computer 60, via lines 66 and 66′ respectively, the flight of the aircraft is simulated in the roll and yaw planes. A flight computer incorporating such a lateral computing system is described in Section 5 of a paper entitled "Flight Simulators" published in "The Journal of the Royal Aeronautical Society," vol. 58, No. 519, March 1954.

The aileron and rudder controls form part of servo systems 61 and 62 respectively. These servo systems each have a hydraulic servo, transducer and potentiometer generally similar to those of the elevator system shown in FIG. 1. The servos provide "feel" to the aileron and rudder controls.

Aileron and rudder channel computers 63 and 64 respectively, of the auto-pilot computer provide on lines 67, 67′ demand signals to position servos 61 and 62 respectively, when the auto-pilot is in use. Attitude and rate data for the operation of channels 63 and 64 of the auto-pilot computer are derived from the computing system 60. Rate of roll and roll angle signals, represented by $p$ and $\phi$, are fed by lines 65 and 65′ to the computer 63 and a rate of yaw signal, represented by $r$ is fed, via line 65″, to computer 64.

In actual aircraft, the basic auto-pilot/I.L.S. computer, when set for localiser operation, provides for control of heading to follow the localiser path. Corrective terms are produced from the deviation signals used to feed the localiser circuit of the I.L.S. instrument. The signals are fed mainly into the auto-pilot aileron channels but, to avoid sideslip in a turn, may also be fed into the rudder channel.

It is customary to use this mode of control for an approach of from 1500 feet to 200 feet, when the ground is visible from a height of 200 feet and a visual approach can be made thereafter. In the automatic blind landing system, a secondary localiser of greater precision is used to take over from the I.L.S. at a height of about 200 feet, to guide the aircraft to a height of about 50 feet. The secondary localiser may take several forms, for example, a leader cable, a radar beacon system, or a beacon similar to an I.L.S. but with greater accuracy. In each case the receiving unit in the aircraft is designed to produce misalignment data of the aircraft with respect to the runway and the method of simulation is similar.

The resolver in the computing system 20 of FIG. 1 produces a signal representing the bearing of the aircraft from a selected touchdown point. This point may not be coincident with the origin of the leader beam.

It may be seen that the transverse displacement of the aircraft from the runway centre-line is given by the expression $x \cos \psi - y \sin \psi$ and $x$ and $y$ are the East-West and North-South displacements of the simulated aircraft from the point of touchdown respectively and $\psi$ is the runway bearing. A signal corresponding to this error is used as an error input to the roll and yaw channel computers 63 and 64 to control the flight of the simulated aircraft when the auto-pilot is switched on. The method of computing this signal will now be described.

In FIG. 2, parts of the North-South and East-West integrators are shown within broken outlines having the reference numbers 21 and 22, as in FIG. 1. In the North-South integrator 21, the output shaft 68 of the motor of a servo system of conventional design, which is not shown, is mechanically coupled to a speed reduction gear 69. To an output shaft 71 of the reduction gear 69 is coupled a wiper of a potentiometer 72 and a speed reduction gear 70. An output shaft 73 of the reduction gear 70 is coupled to the wiper of a switching unit 74 and to the wiper of a potentiometer 75. The speed ratio of the reduction gear 70 is 50:1, so that the wiper of the potentiometer 72 makes 50 revolutions for each revolution of the wipers of unit 74 and potentiometer 75.

The windings of potentiometers 72 and 75 are connected to a source of alternating current used to supply the computing system of the simulator and have centre taps which are earthed. A section 76 of the track of the switching unit, one fiftieth of the track length, is conductive and is connected by line 77 to the wiper of potentiometer 72. The wipers of the switching unit 74 and the potentiometer 75 are connected by lines 78, 78′ respectively to contacts 79′, 79″ respectively of a relay 80. The wipers of potentiometer 72 and switching unit 74 are positioned with respect to the wipers of potentiometer 75 so that an output signal is produced on contact 79′ only when the wiper of potentiometer 75 is positioned within one-hundredth of its length of track on either side of the centre tap. The signals provided on contacts 79′ and 79″ represent North-South displacements, the maximum value of the signals on contact 79′ corresponding to a displacement one-fiftieth of that represented by the maximum value of the signal on contact 79″.

The East-West integrator 22 is similar to the integrator 21. An output shaft 81 of the servo system of the integrator, not shown, is coupled to drive speed reduction gears, potentiometers and a switching unit as in the integrator 21. East-West displacement signals are fed to contacts 82′, 82″ which are also a part of the relay 80.

Thus, the displacement co-ordinate signals on contacts 79′ and 82′ have enhanced definition, to enable a secondary localiser system of greater precision to be simulated. The displacement signals fed to the computing system 20, FIG. 1, are provided from the wipers of the potentiometers connected to contacts 79″ and 82″ via lines 21′ and 22′ respectively, the references being the same as in FIG. 1.

The co-ordinate signal from contact 79′ or from contact 79″ is fed, via contact 79 and line 83, to the input of a co-ordinate amplifier 85. The co-ordinate signal from contact 82′ or from contact 82″ is fed via contact 82 and line 84 to the input of a co-ordinate amplifier 86.

The coil of relay 80 is connected to the output of switching amplifier 34, via line 87. When the computed height is greater than 200 feet, the coil is de-energised and the low definition co-ordinate signals on contacts 79″ and 82″ are fed to the amplifiers 85 and 86. When the computed height is below 200 feet, the coil is energised and the high definition signals are fed to amplifiers 85 and 86.

The East-West output signal from amplifier 86, represented by the value $x$, is fed via a pair of lines 88 to a sine/cosine potentiometer 89 and the North-South output signal from amplifier 85 is fed, via a pair of lines 90, to a sine/cosine potentiometer 91. The wipers of the potentiometers 89, 91 are coupled to a common shaft 92 which is set manually via a control 93 to position the shaft to an angle $\psi$ with respect to a fixed reference, corresponding to runway heading. The wipers are positioned to provide output signals corresponding to $x \cos \psi$ and $-y \sin \psi$. These output signals are fed via lines 94 and 95 to the input of an amplifier 96, where they are summed to produce the error signal $x \cos \psi - y \sin \psi$. The error signal is fed to the computers 63 and 64 by way of lines 97 and 97′ respectively.

When an actual aircraft is landing in a crosswind, it must adopt an attitude in the air which corresponds to flying slightly up-wind, so as to cancel the effect of the wind trying to blow the aircraft across the runway. As a result, the aircraft adopts a drift angle with respect to the centre line of the runway.

The drift angle must be removed before landing and the main wheels must at the same time be kept level. This may be achieved by deflecting the rudder to swing the tail into line with the runway. However, this produces sideslip with respect to the wind and a roll acceleration results which, if maintained for a sufficient period, causes the main wheels to drift from level. This latter tendency may be held in check by deflecting the ailerons and this correction is therefore used only in the final stages of landing. Furthermore, an acceleration away from the runway centre-line results, which cannot be controlled.

A preferred method of carrying out the correction process is to return the auto-pilot to a heading mode of control for the last phase of the landing. The heading error-signal is computed using transmitting and receiving synchro units 98 and 99 respectively, which units are of conventional design. The rotor of unit 98 is coupled to the common shaft 92 of potentiometers 89 and 91. The rotor of unit 99 is mechanically coupled to a shaft 101 of the heading angle integrator of the lateral computing system 60. The rotor winding of unit 98 is connected to the source of alternating current used to supply the computing system of the simulator. The stator windings are connected together by lines 100, 100′ and 100″. The rotors of the two units are so orientated that the output signal from the rotor winding of unit 99 represents the angular difference between the aircraft and runway headings. This signal is fed, via line 102 and a first contact pair 103, 103′ of a relay 104, to the input of the yaw channel 64 of the auto-pilot computing system.

The relay 104 is provided with a second contact pair 105, 105′ by which the roll angle signal $\phi$ is fed to the input of the roll channel 63 of the auto-pilot computing system.

The coil of relay 104 is connected to the switching amplifier 35, of FIG. 1, via line 106. When the computed height is at a predetermined value, the coil of relay 104 is energised and the contact pairs 103, 103′, and 105, 105′ are closed. This height varies for different aircraft and is governed by the requirement that the time left before touchdown is sufficient to allow the nose of the aircraft to be lined up with the runway on the first swing of the oscillation which a kick normally induces. The heading and roll correction signals are then fed to the computing channels 63 and 64 to bring the heading of the aircraft to the same heading as the runway and the roll angle of the aircraft substantially to zero.

In the blind landing system already referred to, automatic landing is carried out in three stages, using different forms of longitudinal and lateral control at heights ranging from 1500 feet to 200 feet, from 200 feet to 50 feet, and from 50 feet to 0 feet.

In an alternative system to that described above control is effected in a manner generally similar to that of the three stage system described, but change of control takes place at different altitudes in five stages, the auto-pilot is engaged manually at a height of 600 feet, determined from the reading of a radio altimeter.

The stages of operation of the system are defined as follows:

| | |
|---|---|
| Track | Determined by normal flying procedures at circuit height. |
| Glide | |
| Leader cable | Down to 300 feet. |
| Attitude hold | From 300 feet to 0 feet. |
| Flare-out | From 100 feet to 60 feet. |
| Drift correction (kick-off) | From 60 feet to 0 feet. From 20 feet to 0 feet. |

The reference pitch angle for attitude hold is an average of the pitch angle throughout the approach, prior to this phase, computed automatically within the auto-pilot.

The simulation of such a system necessitates the use of four switching amplifiers, pre-set to operate with signals corresponding to heights of 300, 100, 60 and 20 feet. The average pitch angle is derived from the pitch angle computed in the system 10.

In addition to attitude control, modern auto-pilots may have a speed control to regulate the airspeed by automatic setting of the engine throttle controls.

In the simulator, an airspeed signal from the computing system 10, FIG. 1, is compared with a selected airspeed and the resulting error is used as an input to control throttle positioning servos. During an automatic landing, it may be necessary to cut off power, using the throttle controls. This may be done on the basis of a fixed time programme which is brought into operation at a predetermined altitude when the auto-pilot is switched to a different form of longitudinal control. The required throttle function is determined in a function generator and the signal so derived is fed to the throttle servos.

What I claim is:

1. Ground-based flight training apparatus for simulating operation of an aircraft automatic landing system, and comprising flight computing means for simulating flight conditions, auto-pilot simulating means for simulating longitudinal and lateral control by an aircraft auto-pilot, said auto-pilot simulating means being responsive to a plurality of alternative control signals corresponding each to a different longitudinal control mode, control signal generating means for each of the alternative control signals and switch means operated by altitude signals corresponding to different altitudes for supplying to the auto-pilot simulating means a selected one of the alternative control signals, said altitude signals being computed by the flight computing means which provides an aircraft height signal corresponding to the simulated height of the aircraft above a reference level, a range computing means for computing simulated range, and a terrain height generator means for generating a signal corresponding to the height of the terrain above the said reference level, the control signal provided by one of the control signal generating means being derived from the simulated range computing means, the said range computing means being fed with signals obtained from the flight computing means, and the control signal provided by another of the control signal generating means being derived from the terrain height generator, wherein said terrain height generator is operative to generate a signal in response to a signal derived from the range computing means.

2. A ground-based flight training apparatus as claimed in claim 1 wherein one of said control signal generating means is responsive to said altitude signals to provide a flare-out control signal which is a function of computed height of the aircraft above said reference level and of the differential and integral thereof with respect to time, and said switch means is operative to supply said flare-out control signal to the auto-pilot simulating means from the lowest of said different altitudes to the said reference level.

3. A ground-based flight training apparatus as claimed in claim 2 having first switch means operative in response to altitude signals representing between 20 feet and 1000 feet of altitude and second switch means operative in response to altitude signals representing between 0 and 1000 feet of altitude.

4. A ground-based flight training apparatus as claimed in claim 2, in which simulated lateral control is provided by computing an error signal given by the expression $x \cos \psi - y \sin \psi$, where $x$ and $y$ are East-West and North-South displacements of the simulated aircraft from a point of touchdown on a runway and $\psi$ is the runway bearing, the error signal so provided being fed to the auto-pilot simulating means to control the flight of the simulated aircraft.

5. Ground-based flight training apparatus as claimed in claim 1 having first switch means operative in response to an altitude signal representing between 20 feet and 1000 feet of altitude and second switch means operative in response to an altitude signal representing between 0 and 100 feet of altitude.

6. Ground-based flight training apparatus as claimed in claim 3, and further comprising signal generating means for generating a height-error signal and control signal generating means for generating a pitch control signal, said first switch means being operative to interrupt the supply of the height-error signal to the auto-pilot simulating means and to select the pitch control signal.

7. Ground-based flight training apparatus as claimed in claim 6, in which the second switch means is operative to interrupt the supply of the pitch control signal to the auto-pilot simulating means and to select the flare-out control signal.

References Cited by the Examiner

UNITED STATES PATENTS

| | | | |
|---|---|---|---|
| 2,987,275 | 6/1961 | Moncrieff-Yeates et al. | 244—77 |
| 3,026,630 | 3/1962 | White et al. | 35—12 |
| 3,031,658 | 4/1962 | Green et al. | 343—6 |
| 3,052,427 | 9/1962 | Match et al. | 244—77 |
| 3,053,487 | 9/1962 | Baldwin et al. | 235—150.22 X |
| 3,059,880 | 10/1962 | Buxton | 244—77 |
| 3,059,881 | 10/1962 | Letson | 244—77 |
| 3,081,969 | 3/1963 | Farris et al. | 235—150.22 X |
| 3,110,458 | 11/1963 | Bishop | 244—77 |
| 3,131,018 | 4/1964 | Brodzinsky et al. | 343—6 |
| 3,177,484 | 4/1965 | Case et al. | 244—77 |

MALCOLM A. MORRISON, *Primary Examiner.*

I. KESCHNER, *Assistant Examiner.*